US009944743B2

(12) United States Patent
Mestach et al.

(10) Patent No.: US 9,944,743 B2
(45) Date of Patent: Apr. 17, 2018

(54) WATERBORNE HYBRID POLYMER DISPERSION

(71) Applicant: Allnex Netherlands B.V., Bergen Op Zoom (NL)

(72) Inventors: Dirk Emiel Paula Mestach, Nijlen (BE); Rob Adolphs, Bavel (NL); Adam Berry, Auckland (NZ); Maria Paulis, Donostia-San Sebastián (ES); Maria Barandiaran, Donostia-San Sebastián (ES); José Asua, Donostia-San Sebastián (ES); Monika Goikoetxea, Hondarrilbia (ES); Itxaso Beristain, Urnieta (ES)

(73) Assignee: ALLNEX NETHERLANDS B.V., Bergen Op Zoom (NL)

( * ) Notice: Subject to any disclaimer, the term of this patent is extended or adjusted under 35 U.S.C. 154(b) by 0 days.

(21) Appl. No.: 15/009,851

(22) Filed: Jan. 29, 2016

(65) Prior Publication Data
US 2016/0311957 A1    Oct. 27, 2016

Related U.S. Application Data

(63) Continuation of application No. 13/638,106, filed as application No. PCT/EP2011/055037 on Mar. 31, 2011, now Pat. No. 9,328,187.

(30) Foreign Application Priority Data

Mar. 31, 2010    (EP) .................................... 10158835

(51) Int. Cl.
| | |
|---|---|
| C08F 290/06 | (2006.01) |
| C09D 11/105 | (2014.01) |
| C09D 151/08 | (2006.01) |
| C09J 151/08 | (2006.01) |
| C08F 2/24 | (2006.01) |
| C09D 5/02 | (2006.01) |
| C09D 11/10 | (2014.01) |

(52) U.S. Cl.
CPC ............ *C08F 290/061* (2013.01); *C08F 2/24* (2013.01); *C09D 5/02* (2013.01); *C09D 11/10* (2013.01); *C09D 11/105* (2013.01); *C09D 151/08* (2013.01); *C09J 151/08* (2013.01)

(58) Field of Classification Search
CPC .......... C08F 20/061; C08F 2/24; C09D 11/10; C09D 151/08; C09J 151/08
See application file for complete search history.

(56) References Cited

U.S. PATENT DOCUMENTS

| | | | |
|---|---|---|---|
| 3,620,989 A | 11/1971 | Cumming | |
| 3,847,851 A | 11/1974 | Tugukumi | |
| 3,919,145 A | 11/1975 | Eckhoff | |
| 4,108,811 A | 8/1978 | Eckhoff | |
| 4,413,073 A | 11/1983 | Gibson | |
| 6,001,922 A | 12/1999 | Clark | |
| 6,369,135 B1 | 4/2002 | Schork et al. | |
| 6,489,398 B1 | 12/2002 | Zückert et al. | |
| 6,627,700 B1 | 9/2003 | Kadambande et al. | |
| 9,328,187 B2 * | 5/2016 | Mestach ................... C08F 2/24 |

FOREIGN PATENT DOCUMENTS

| | | |
|---|---|---|
| EP | 0295403 B1 | 6/1993 |
| EP | 0608020 B1 | 6/1997 |
| GB | 190322875 A | 11/1903 |
| GB | 2237276 A | 5/1991 |
| WO | 9502019 A2 | 1/1995 |
| WO | 9726303 A1 | 7/1997 |
| WO | 9813404 A1 | 4/1998 |
| WO | 9907799 A1 | 2/1999 |
| WO | 0100741 A1 | 1/2001 |
| WO | 0228977 A2 | 4/2002 |
| WO | 03040192 A2 | 5/2003 |

OTHER PUBLICATIONS

European Search Report for Priority Application EP10158835.8 dated Jul. 23, 2010.
International Search Report for PCT/EP2011/055037 dated Apr. 28, 2011.
Written Opinion for PCT/EP2011/055037 dated Apr. 28, 2011.
International Preliminary Report on Patentability for PCT/EP2011/055037 dated Jul. 5, 2012.
T. Nabuurs et al, Progress in Organic Coatings, vol. 27, p. 163-172 (1996).
T. Nabuurs, doctoral thesis, Alkyd-acrylic composite emulsions: polymerization and morphology, Technische Universiteit Eindhoven, 1997.
Wang et al, J. Appl. Polym. Sci, vol. 60, p. 2069-2076 (1996).
J.M. Asua, Mini-emulsion Polymerization, Prog. Polym. Sci. 27, 1283-1346 (2002).
I. Capek et al, Radical Polymerization in Direct Mini-Emulsion Systems, Advances in Polymer Science, vol. 155 (2001).
Fung-Bor, Chen et al, J. Appl. Poly. Sci., vol. 30, 4571-4582 (1985).
Manea et al, AICHE J. 2008, 54, 289-297.
Lopez et al, Ind. Eng. Chem. Res. 2008, 47, 6289-6297.
Minari, R.J. et al, "Molecular Characterization of Alkyd/Acrylic Latexes Prepared by Miniemulsion Polymerization" J. Appl. Polym. Sci., vol. 114, p. 3143-3151, Jul. 28, 2009.
Guyot et al: "Hybrid polymer latexes", Progress In Polymer Science, vol. 32, No. 12, p. 1439-1461, Nov. 14, 2007.

* cited by examiner

*Primary Examiner* — Irina S Zemel
*Assistant Examiner* — Jeffrey S Lenihan

(57) ABSTRACT

The process for the manufacture of an auto-oxidatively cross-linking hybrid polymer, in particular an aqueous hybrid polymer dispersion, comprises the step of reacting in a mini-emulsion process one or more ethylenically unsaturated monomers to form an addition polymer in the presence of a modified auto-oxidatively crosslinkable (AOC) polymer which has been modified with terminal unsaturated groups of the formula —C(R1)=CH2 wherein R1 is hydrogen, alkyl or aryl and wherein the AOC polymer is a hydrophobic polymer having an acid number between 5 to 30. The resulting aqueous hybrid polymer dispersion can be used for the manufacture of coating compositions, ink compositions or adhesives and coating compositions comprising the hybrid polymer dispersion as a binder.

16 Claims, No Drawings

WATERBORNE HYBRID POLYMER DISPERSION

CROSS REFERENCE TO RELATED APPLICATIONS

This application is a continuation of U.S. patent application Ser. No. 13/638,106, filed on Sep. 28, 2012, which is a 35 USC § 371 national phase entry of PCT application number PCT/EP2011/055037, filed on Mar. 31, 2011, which claims priority to a European patent application 10158835.8, filed on Mar. 31, 2010. All applications are hereby incorporated by reference in their entireties.

FIELD OF THE INVENTION

The invention relates to a process for the manufacture of an auto-oxidatively cross-linking hybrid polymer comprising the step of reacting one or more ethylenically unsaturated monomers to form an addition polymer (also referred to as a vinyl polymer) in the presence of an auto-oxidatively crosslinkable polymer (hereafter also referred to as AOC polymer). In particular, the invention relates to a process for the manufacture of an aqueous hybrid polymer dispersion comprising an auto-oxidatively crosslinkable polymer and an addition polymer. The invention further relates to the aqueous hybrid polymer dispersion obtainable by the process according to the invention, the use thereof for the manufacture of coating compositions, ink compositions or adhesives and to coating compositions comprising the hybrid polymer dispersion as a binder.

Auto-oxidatively crosslinkable polymers are polymers that crosslink on exposure to oxygen, for example when drying in air. These polymers generally contain unsaturated moieties that originate from unsaturated oils or fatty acids: these materials are converted to hydroperoxides by auto-oxidation on contact with oxygen from the air. These hydroperoxides can form free radicals that initiate a polymerization reaction that leads to the crosslinking of the polymer. Auto-oxidatively crosslinkable polymers are also referred to as auto-oxidatively drying polymers.

In the context of this invention a hybrid polymer is a polymer formed by addition polymerization of ethylenically unsaturated monomers in the presence of an auto-oxidatively crosslinkable polymer.

BACKGROUND OF THE INVENTION

Many attempts have been made to prepare hybrid polymer dispersions, in particular alkyd-vinyl hybrid polymer dispersions, aiming to achieve an ideal balance of the best properties of each of the polymers combined in the hybrid polymer. Alkyd emulsions and vinyl polymer dispersions, made by means of emulsion polymerization, are the two most common waterborne technologies used in the coating industry. Coatings based on alkyd emulsions exhibit advantages over those based on vinyl polymer dispersions in terms of gloss, brush-ability, open time, flow and levelling, hiding per coat, mar resistance, sand-ability, and adhesion. Advantages of vinyl polymer dispersions over alkyd emulsions include quick drying, durability, non-yellowing, non-embrittling, and non-chalking (pigment release by degradation of the binder).

In addition to the advantages described above for alkyds, coatings based on alkyd-modified hybrid dispersions have improved film forming properties due to the presence of alkyd moieties, which typically have a low glass transition temperature (Tg). However, alkyd resins and vinyl polymers are incompatible, and hence prone to suffer phase segregation that results in haziness and lower gloss. Compatibility can be improved by enhancing grafting of the vinyl polymer onto the alkyd resin but this causes the loss of the unsaturated groups of the alkyd, which results in the deterioration of the auto-oxidation properties of the alkyd. The presence of the phase-separated alkyd also results in critical problems, such as soft films (causing dirt pick-up and poor block resistance) and yellowing. High residual monomer content is a threat to the environment and health and is strictly regulated. Furthermore, during the addition polymerisation, unsaturated groups on the alkyd are lost, resulting in the deterioration of the auto-oxidation properties of the alkyd. The known hybrids also have an undesirably low open time, defined as the period of time during which corrections can be made in the wet paint film without leaving brush marks.

PRIOR ART

From U.S. Pat. Nos. 3,919,145, 4,108,811 and WO9726303 it is known that blending oxidatively drying polymers with acrylic polymer dispersions reduce yellowing and in some cases cost. However the performance of the resulting coatings, in particular the mechanical properties and the resistance to chemicals is greatly reduced. U.S. Pat. No. 6,001,922 discloses a blend of polyester/acrylic hybrid latexes with an alkyd.

T. Nabuurs and A. German, Progress in Organic Coatings, Vol. 27, pages 163-172 (1996) discuss that a mixture of alkyd and vinyl polymers can exist as a blend of a vinyl polymer dispersion and an alkyd dispersion, however although the dispersions are blended, the alkyd and vinyl polymers each exist in distinct particles or phases causing application problems like a lower gloss. (see also "Alkyd-acrylic composite emulsions: polymerization and morphology", Tijs Nabuurs, doctoral thesis, Technische Universiteit Eindhoven, 1997, ISBN 90-386-0978-7).

A more effective way to form an intimate dispersion could b expected to be by forming the acrylic polymer in-situ, namely by polymerizing the acrylic monomers in the presence of the alkyd dispersion. U.S. Pat. No. 3,847,851 discloses the preparation of solvent based dispersions prepared by polymerizing monomers in the presence of alkyd resins, hut large amounts of volatile organic compounds are used. U.S. Pat. No. 4,413,073 discloses the preparation of dispersions of film forming polymer produced by polymerization of monomers in the presence of preformed polymers. Wang et al., J. Appl. Polym. Sci, vol 60 pages 2069-2076 (1996) discuss the emulsion and mini-emulsion copolymerization of acrylic monomers in the presence of alkyds. However the through-dry time (oxidation of the film) of such coatings is longer due to the decreased degree of unsaturation in the alkyd resulting from the copolymerization with the vinyl monomers.

WO 98/13404 discloses the preparation of a polyurethane-alkyd resin/acrylate aqueous dispersion, which is prepared by first forming the polyurethane-alkyd resin in methyl ethyl ketone. After neutralization of the polyurethane-alkyd resin, it is dispersed in water, and then the methyl ethyl ketone removed. After that at least one olefinically unsaturated monomer substantially having no reactive functional groups other than the double bonds is polymerized in said dispersion, These dispersions have the disadvantage that compatibilization between the polyurethane-alkyd resin and the acrylate polymer is limited, which would result in phase separation. Moreover, the azeotropic distillation of relatively large amounts of solvents present safety, environmental and economic problem. Also they use relatively expensive polyurethanes.

WO0228977 describes an aqueous dispersion comprising an alkyd, a vinylpolymer I, a vinylpolymer II and a liquid medium, wherein said vinyl polymer I is pre-formed prior to incorporation into the aqueous dispersion and wherein said vinylpolymer II is prepared in the presence of the alkyd and the vinylpolymer I. These aqueous dispersions are claimed not to suffer from impaired auto-oxidation properties of the alkyd. This process will not result in the formation of a true hybrid polymer with the disadvantages as described above.

U.S. Pat. No. 6,369,135 describes a hybrid graft copolymer made by dissolving an alkyd resin in various vinyl monomers (methyl methacrylate, styrene, etc.). The monomer/alkyd solution is then mini-emulsion polymerized to form a latex consisting of submicron particles of polymer with the alkyd grafted onto the polymer backbone. The mini-emulsion process is described in the following publications: J. M. ASUA. "Mini-emulsion Polymerization". Prog. Polym. Sci. 27,1283 (2002) and I. Capek and C. S. Chern, "Radical Polymerization in Direct Mini-Emulsion Systems", Advances in Polymer Science, Vol. 155 (2001). The disadvantage of this process is the high residual monomer content and no compatibilization unless a high amount of double bonds of the alkyd are consumed (which would result in a substantial loss of the autoxidation properties of the alkyd).

WO9502019 discloses hybrid emulsions comprising an air-drying alkyd resin, combined with an acrylic resin, dispersed in water. The hybrid emulsions are prepared by first mixing an alkyd emulsion with an acrylic monomer to yield a pre-emulsion. The pre-emulsion is then further emulsified in water in high-pressure emulsifying equipment. The resulting pre-emulsion of the alkyd/acrylic mixture is then heated to 80° C. and an initiator added for a batch emulsion polymerization process. The process of this patent reaches a low limiting conversion resulting in an aqueous dispersion having a high level of residual monomers that is not fit for use in coatings.

U.S. Pat. No. 3,620,989 describes a process for preparing an aqueous dispersion of multi-polymer particles wherein the individual particles comprise both alkyd resin and addition polymer. The alkyd resin having unsaturation in the polymeric backbone derived from the use of an unsaturated diacid or anhydride and the vinyl monomer are emulsified and copolymerized. This polymerization has, however, a relatively poor conversion rate, The examples show a percentage yield of polymer of 85% maximum which means that the compositions contain a high level of free monomer. Such a high level is unacceptable from both toxicological and customer acceptance points of view.

EP0608020 discloses the preparation of aqueous dispersions of core/shell polymers having an acrylic-grafted alkyd resin as the core and an addition polymer as the shell. An alkyd resin is prepared first by conventional means. Next, the alkyd resin is then dissolved in a water-miscible organic solvent and reacted with vinyl monomers, containing at least one of them a carboxyl functionality. The solution of the acrylic grafted alkyd resin is neutralized, and dispersed in water. The dispersion thus obtained may be used as seed in an emulsion polymerization process in order to form an acrylic shell around the alkyd-acrylic graft copolymer. Only limited grafting between the alkyd and the vinyl polymer can be achieved without consuming too many fatty-acid double bonds of the alkyd (which would result in a substantial loss of the autoxidation properties of the alkyd).

U.S. Pat. No. 6,627,700 discloses the preparation of an aqueous dispersion of an acrylate modified alkyd resin for which at least one alkyd containing allyloxy group is dispersed in water containing at least one water-miscible diol such as propylene glycol. The diol is used as a solvent to reduce the viscosity of the alkyd, The water-miscible diols in the patent are organic solvents that contribute to the VOC of the aqueous dispersion. Furthermore the acid value of the alkyd is at least 35 mg KOH/g. Alkyd resins having an acid value higher than 5 are known to have poor hydrolytic stability.

EP0295403B1 discloses water-soluble alkyd resins, converted into the water-soluble form by neutralization of their methacrylic-carboxyl groups, derived from graft copolymers of an unsaturated fatty acid with mixtures of methacrylic acid and acryloyl-methacryloyl-vinyl monomers. Both the graftcopolymer and the acrylic-alkyd copolymer are made by a process utilizing organic solvents. The obtained aqueous acrylic-alkyd emulsion is not free of organic solvents.

WO99/07799 discloses the preparation of an acrylic modified aqueous alkyd dispersion, which is prepared by the polymerization of at least one latent oxidatively-functional acrylic monomer in the presence of a water-reducible alkyd resin. Acrylic monomers having a latent oxidatively-functional group are monomers containing one reactive double bond (e.g., methacrylate) and one non-reactive double bond (e.g., allylic), which after polymerization possess sufficient unreacted double bonds to increase or amplify the degree of crosslinking nominally found in alkyd resins. The disadvantages of this approach are: i) the waterborne alkyd provides undesirable water sensitivity to the coating; ii) the contact between the acrylic polymer and the waterborne alkyd is limited because these polymers are incompatible and hence the interaction between the latent oxidatively-functional groups and the unsaturations of the alkyd resin during film formation is reduced. Furthermore the examples given contain an organic solvent, The object of the invention therefore is to provide a process for the manufacture of a hybrid of an auto-oxidatively crosslinkable polymer and an addition polymer that does not have at least one of the abovementioned disadvantages, in particular a process and resulting product that combines the good properties of both the AOC polymer and the addition polymer in a single composition but with a reduced phase segregation tendency both of the composition itself (storage stability) as well as on drying, resulting for example in better drying properties, low (no) volatile organic compounds and coatings having good chemical resistance, mechanical properties and optical appearance (high gloss) and good film forming properties.

BRIEF DESCRIPTION OF THE INVENTION

According to the invention there is provided a process for the manufacture of an auto-oxidatively cross-linking hybrid polymer comprising the step of reacting in a mini-emulsion process one or more ethylenically unsaturated monomers to form an addition polymer also referred to as the vinyl polymer) in the presence of a modified auto-oxidatively crosslinkable (AOC) polymer which has been modified with terminal unsaturated groups of the formula —$C(R_1)$=$CH_2$ wherein $R_1$ can be hydrogen, alkyl or aryl wherein the modified AOC polymer is a hydrophobic polymer having an acid number between 5 to 30.

In a particularly preferred embodiment the modified AOC polymer is an alkyd resin comprising unsaturated fatty acids wherein preferably the terminal unsaturated group on the AOC polymer is a vinyl, acryloyl or methacryloyl group.

The hybrid polymer is preferably produced by addition polymerization of an aqueous dispersion of ethylenically unsaturated monomers in the presence of the modified oxidatively cross-linkable polymer. The most preferred process is a mini-emulsion polymerisation process comprising the steps of:

I. mixing:
   a) one or more modified auto-oxidatively crosslinkable polymers,
   b) one or more ethylenically unsaturated monomers,
   c) one or more surfactants,
II. forming a mini-emulsion in water of the mixture obtained in step I),
III. adding a free radical initiator before, during and/or after step I), II) and/or IV),
IV. addition polymerizing the unsaturated monomers in the mini-emulsion to form a dispersion of hybrid particles of the auto-oxidatively crosslinkable polymer and the addition polymer,
wherein the auto-oxidatively cross-linkable polymer has been modified by pending unsaturated groups of the formula —C($R_1$)=$CH_2$ wherein $R_1$ can be hydrogen, alkyl or aryl.

We have found that the process according to the invention results in aqueous hybrid polymer dispersions having improved coating compositions and no longer presenting one or more disadvantages of the prior art. In the mini-emulsion polymerisation process, the modified AOC polymer is a hydrophobic polymer wherein the acid value is low, preferably even close to zero. Such that the AOC polymer will act as a hydrophobe in forming the mini-emulsion resulting in a stable mini-emulsion. The auto-oxidatively crosslinkable polymer and the addition polymer are homogeneously distributed in the particles of the aqueous hybrid polymer dispersion, which has better coating properties. The aqueous hybrid polymer dispersions have very low residual ethylenically unsaturated monomer content by achieving a high if not full conversion of the ethylenically unsaturated monomers at the end of the polymerization.

This hybrid polymer has, compared to both a blend of corresponding composition and to a hybrid polymer formed by polymerizing ethylenically unsaturated monomers in the presence of an auto-oxidatively crosslinkable polymer devoid of said terminal unsaturated groups, the advantage of improved storage stability of the dispersion, a reduced tendency to phase segregate upon film-formation and accordingly better coating properties.

Without wishing to be bound by theory it is considered that the improved properties relate to the presence of two different types of unsaturated groups in the modified AOC polymer: internal unsaturated groups in the AOC polymer before modification and terminal unsaturated groups introduced by the modification. In particular, in case of an alkyd, the polymer before modification contains unsaturated moieties originating from fatty acids or oils used in the synthesis of AOC polymer. Fatty acids are long-chained molecules having a methyl group at one end and a carboxylic acid group at the other end; the unsaturated group(s) are in the chain (internal) and not at the end (terminal —C($R_1$)=$CH_2$). The terminal unsaturated groups are more reactive and will preferentially react during addition polymerization. It is believed that as a result the fatty acid unsaturated groups inhibit the addition polymerisation to a lesser extent resulting in less unreacted monomer. Further, the addition polymerisation does not or to a lesser degree reduce the amount of internal unsaturated groups of the alkyd resulting in better drying properties. More importantly, the degree of grafting between the OAC polymer and the addition polymer is significantly increased leading, to less phase segregation.

DETAILED DESCRIPTION OF THE INVENTION

A: The modified Auto-Oxidatively Crosslinkable Polymer

The AOC polymer to be modified can in principle be any polymer comprising internal ethylenically unsaturated groups, preferably originating from unsaturated fatty acids (UFA). Suitable AOC polymers are adducts of hydroxyfunctional vinyl, -polyester or -polyurethanes polymers with UFA. Most preferably the AOC polymer is an alkyd resin comprising unsaturated fatty acids.

Alkyd resins are a common and preferred class of polymers that dry by auto-oxidation. Alkyds are typically manufactured from unsaturated fatty acid residue containing esters which are prepared from the reaction of a polyhydric alcohol, a polybasic acid and a drying oil. Alkyd resins are well known in the art. General processes for preparing alkyds are disclosed in U.S. Pat. No. 4,108,811 and in "Alkyd Resin Technology", T C Patton, 1962, Publisher John Wiley & Sons Inc.

The acid number of the modified AOC polymer, preferable the alkyd resin is from 5 to 30 mg KOH/g, more preferably from 5 to 25 mg KOH/g and even more preferably from 5 to 20 mg KOH/g. The molecular weight, hydroxyl number and iodine number of the alkyd resin are guided by the intended use of the dispersion of the invention and may vary widely. Preferably, in view of the envisaged water resistance of the coating, the alkyd resin preferably is hydrophobic includes acid groups that are carboxyl groups and have an acid value that is not higher than about 25 mg KOH/g. In another embodiment, the alkyd resin may comprise acid groups derived from sulphur and/or phosphorous.

The number average molecular weight of the modified AOC polymer or alkyd is preferably from 1000 to 50000, more preferably from 1500 to 25000 and even more preferably from 2000 to 15000. Preferred types are long oil and medium oil alkyds. The oil length of the alkyd resins preferably from 20 to 95%, more preferably from 30 to 90% and even more preferably from 40 to 85%. The oil length is the percent of oil (or fatty acid) calculated as triglyceride, being used in the synthesis of the alkyd. Commercially available alkyds that can be used in this invention are available for example under the trade names Setal 293 XX-99, Setal 249 XX-99 and Setal 254 from Nuplex Resins. Alkyds are typically prepared by the reaction of a polyhydric alcohol, a polybasic acid and a drying oil.

The AOC modified polymer or alkyd contains unsaturated fatty acid residues which undergo crosslinking by auto-oxidation. The unsaturated fatty acid can be derived from for example linseed, sunflower seed, safflower seed, tobacco seed, soya bean, dehydrated castor, marine animal and tung oils. Another fatty acid that can be used is obtained by fractional distillation of tall oil rosin. When rosin content is reduced to 1-10%. The resulting tall oil fatty acid (TOFA) can be used in the alkyd resins according the invention. The unsaturation in polymers from such groups imparts latent crosslinkability so that when a coating composition thereof is dried in air (often in conjunction with a drier salt) the composition undergoes crosslinking, thereby improving its properties such as mechanical properties (improved hardness and durability) and chemical resistance. A further advantage of coatings containing unsaturated fatty acid residues is an improved glossy appearance. Preferably these alkyds are high solids or solvent-free and have a molecular weight that allows the solution of the alkyd in the vinyl monomers to be easily emulsified.

Another class of oxidatively crosslinkable polymers are uralkyds that may be prepared by reacting alkyds having isocyanate-reactive groups, preferably hydroxyl groups, with polyisocyanates and optionally other components having isocyanate-reactive groups.

Another class of polymers that can crosslink through auto-oxidation are the reaction products of epoxy resins, preferably produced from the reaction between epichlorohydrin and bisphenol-A, with fatty acids. Epoxy resins are commercially available under the trade-name Epikote™ and Epori™ (Hexion Specialty Chemicals) or Dow Epoxy Resin™ (Dow Chemical).

A special group of resins that dry by auto-oxidation are resins containing hydroxyl terminated polybutadienes. The hydroxyl groups of these polybutadienes, primarily, allylic, exhibit good reactivity in condensation or polyaddition reactions. Hydroxyl-terminated polybutadienes are commercially available from Elf Atochem under the trade name PolyBd®.

Most preferably, the auto-oxidatively drying polymer is an alkyd having unsaturated fatty acids. Preferably these alkyds are high solids or solvent-free and have a molecular weight that allows the solution of the alkyd in the vinyl monomers to be easily emulsified. Solvent-free means substantially no organic solvent, implying that the volatile organic compound (VOC) amount is preferably less than about 25 g/l. The same requirement applies in general to the AOC hybrid polymer according to the invention. The VOC for these purposes means any organic compound having an initial boiling point less than or equal to 250° C. measured at a standard pressure of 101.3 kPa.

The AOC polymer is modified with terminal unsaturated groups of the formula —C($R_1$)=$CH_2$ wherein $R_1$ can be hydrogen, alkyl or aryl. The alkyl most preferably is methyl, but other lower alkyls are also possible. The aryl is preferably phenyl or lower alkyl substituted phenyl. The alkyl or aryl group can be substituted, but preferably only with non-reactive groups that do not interfere with the chemistry of the composition. Most preferably the terminal unsaturated group on the modified AOC polymer is a vinyl, acryloyl or methacryloyl group.

The average amount of the terminal unsaturated groups is chosen balancing on one hand that after the addition polymerisation step IV the amount of ungrafted modified AOC polymer or addition polymer is preferably low whereas on the other hand the amount of grafting should not be too high to prevent excessive gel forming within the hybrid particles which may negatively influence the film forming properties. The skilled person can find the optimum amount for the envisaged use of the composition. Generally, it is preferred that the average amount of terminal unsaturated groups per modified AOC polymer molecule is more than 1. Because the AOC polymer has a molecular weight distribution, to assure that most AOC polymer molecules have at least one terminal unsaturated group, it is preferred that the average amount of terminal unsaturated groups is more than 1.2 and more preferably more than 1.5. To prevent too much gel formation the amount is preferably less than 2 and more preferably less than 1.7.

The average amount of terminal unsaturated groups per molecule can be determined by measuring in a sample the total amount of =$CH_2$ groups, using a quantitatively calibrated spectrometric absorption specific for said group (for example using $^{13}C$ NMR) and dividing that by the number of molecules in the sample calculated from the number average molecular weight as determined by gel permeation chromatography (GPC).

The modified AOC polymer can be prepared in many different ways, but most suitably by reacting A) carboxylic acid or -anhydride or B) hydroxyl reactive groups on an AOC polymer with a compound comprising the terminal unsaturated group and respectively A1) epoxy or A2) hydroxyl reactive groups or B1) carboxylic acid or -ester or B2) isocyanate reactive groups. Preferably the modified AOC polymer comprises carboxylic acid reactive groups reacted with glycidyl ester of an acrylic or methacrylic acid. Most preferably, the modified AOC polymer is prepared by reacting appropriate functional groups in an alkyd resin with co-reactive compound bearing a vinyl, acryloyl or methacryloyl group.

For example the modified AOC polymer can be prepared in a process comprising the reaction of carboxylic acid or anhydride groups on the AOC polymer, preferably the alkyd resin, with epoxy-functional vinyl, acryloyl or methacryloyl compounds such as allyl glycidyl ether, glycidyl acrylate and glycidyl methacrylate. Also hydroxyalkyl (meth)acrylates such as 2-hydroxyethyl acrylate, 2-hydroxyethyl methacrylate, 2-hydroxypropyl methacrylate, 2-hydroxypropyl acrylate, 4-hydroxybutyl acrylate, 4-hydroxybutyl methacrylate can be used to modify the alkyd resin by esterification.

Another route to functionalize the alkyd resin is via the hydroxyl-functionality by esterification or transesterification with olefinically unsaturated monocarboxylic acids or the corresponding alkyl esters thereof, with the general formula of $H_2C$=$CR_1$—$(CR_1R_2)_n$—C(=O)—$OR_3$, where $R_1,R_2$ and $R_3$=H, alkyl and n=0 to 20, such as acrylic acid or methacrylic acid, 3-Butenoic acid, 4-pentenoic acid, 3-Methyl-4-pentenoic acid, 2,2-Dimethyl-4-pentenoic acid, 5-Hexenoic acid.

Also the reaction of hydroxyl groups on the alkyd resin with isocyanato functional vinyl, acryloyl or methacryloyl compounds is possible. Examples of such compound are vinyl isocyanate, 3-isopropenyl-α,α-dimethylbenzyl isocyanate (TMI®) (meta) from Cytec Industries), 2-methacryloyloxyethyl isocyanate (Karenz MOI® from Showa Denko) or adducts of hydroxyalkyl (meth)acrylates with di or triisocyanates.

In a preferred embodiment, the modified AOC polymer is prepared by reaction of: (a) 85 to 96 wt % a carboxyl functional alkyd resin, and (b) 4 to 15 wt % a glycidyl ester of an acrylic or methacrylic acid, wherein the weight percents are based on the total weight of (a) and (b).

The reaction between the carboxyl functional alkyd resin, and the glycidyl ester of an acrylic or methacrylic acid may be conducted at a temperature range between 100 and 200° C., more preferably form 120 to 180° C. and even more preferably from 130 to 170° C. A free radical inhibitor (is preferably used) may optionally added. Glycidyl methacrylate is the preferred glycidyl ester.

B. The Vinyl Monomers

Ethylenically unsaturated monomers, hereinafter also referred to as "vinyl monomers" are added to the auto-oxidatively crosslinkable polymer containing pendant or terminal vinyl, acryloyl or methacryloyl groups. Examples of olefinically unsaturated monomer(s) which may be used to form the addition polymer include but are not limited to 1,3-butadiene, isoprene, styrene, α-methyl styrene, divinyl benzene, indene, acrylonitrile, methacrylonitrile, vinyl halides such as vinyl chloride, vinyl esters such as vinyl acetate, vinyl propionate, vinyl laurate, and vinyl esters of versatic acid such as VeoVa 9 and VeoVa 10 (VeoVa is a trademark of Hexion Specialty Chemicals), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula $CH_2=CR_2-COOR_3$ wherein $R_2$ is H or methyl and $R_3$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, trifluorethyl(meth)acrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as 2-hydroxyethyl acrylate, 2-hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Dow Chemical). Olefinically unsaturated monocarboxylic and/or dicarboxylic acids, such as acrylic acid, methacrylic acid, fumaric acid, and itaconic acid are other examples that can be used.

It is also possible to use minor amounts of monomers containing a second ethylenically unsaturated bond in order to obtain a higher gel-fraction in the vinyl polymer. Non-limiting examples are ethyleneglycol di(meth)acrylate, allylmethacrylate and divinyl bezene, Also monomers such as diallyl maleate, triallylcyanurate, 2,4,6-Triallyloxy-1,3,5-triazine, 1,3,5-Triallyl-1,3,5-triazine-2,4,6(1H,3H,5H)-trione, triallyl 1,3,5-benzenetricarboxylate, can be used for that purpose.

Other olefinically unsaturated monomers that can be used are those monomers that contain a fatty acid derived ester-group such as oleyl (meth)acrylate, linoleyl (meth)acrylate, and linolenyl (meth)acrylate, synthesis of these monomers is described in J. Appl. Poly. Sci., 30, 4571-4582 (1985), the analogue vinyl esters or monomers derived from the addition reaction between glycidyl (meth)acrylate and a fatty acid such as mentioned in British patent application GB 2237276. These monomers provide auto-oxidative drying properties also to the vinyl polymer part of the hybrid polymer. Other monomers that can be used comprise the vinyloxazoline diesters of unsaturated fatty acids like such as Dapro FX 521 commercially available from Elementis Specialities. In view of achieving good properties in the most preferred application in coatings, the particularly preferred addition polymers are styrene and/or acrylic polymers (i.e. based predominantly on styrene and/or at least one ester of acrylic or methacrylic acid).

The vinyl monomers are reacted by addition polymerisation in the presence of the modified AOC polymer to produce a hybrid polymer that has a high degree of grafting. The reaction can be done by processes known in the art, for example in an appropriate solvent or in aqueous dispersion. An aqueous dispersion can also be made by preparing the reaction product in a solvent and then dispersing the solution in water with a surfactant and removing the solvent. However, in a most preferred embodiment, the process is a mini-emulsion process as described in detail below.

Preferably, the amount of vinyl monomers added to the modified AOC polymer is 30 to 70 wt % and more preferably 40 to 60 wt % relative to the total of the modified AOC polymer and vinyl monomers.

II. Preparing a Mini-Emulsion.

The process according to the invention is a mini-emulsion polymerisation process. In a preferred embodiment of the present invention, a mixture of the modified auto-oxidatively crosslinkable polymer containing terminal unsaturated groups and the vinyl monomers is dispersed in water with the aid of one or several surfactants to form a mini-emulsion. A comprehensive review on mini-emulsion polymerization has been published by J. M. Asua, Prog. Polym, Sci., 2002, 27, 1283-1346. Mini-emulsions are meta-stable dispersions that degrade over time by molecular diffusion (Oswald ripening effect). The advantage of mini-emulsion polymerisation is that in a mini-emulsion, containing few or no micelles, prevalent droplet nucleation occurs. This represents an advantage over emulsion polymerization as there is no need to transport monomer and alkyd resin through the aqueous phase, which yields a more uniform distribution of alkyd and vinyl polymer over the hybrid particles, possibly a higher solids content and a better control of the particle size distribution, resulting in better properties in application of the hybrid polymer for example in coatings.

This process comprises the steps of I) mixing a) one or more modified AOC polymers, b) one or more ethylenically unsaturated monomers, c) one or more surfactants. II) forming a mini-emulsion in water of the mixture obtained in step I), III) adding a free radical initiator before, during and/or after step I), II) and/or IV), (IV) addition polymerizing the unsaturated monomers in the mini-emulsion to form a dispersion of hybrid particles of the auto-oxidatively cross-linkable polymer and the addition polymer, wherein the auto-oxidatively cross-linkable polymer has been modified by pending unsaturated groups of the formula $-C(R_1)=CH_2$ wherein $R_1$ can be hydrogen, alkyl or aryl.

Preferably, the process comprises the steps of I) mixing a) one or more modified AOC polymers in an amount of 10 to 90 wt % (wt % here and hereafter defined as the weight relative to the total weight of the mixture of the components in step (I) to (III)), b) one or more ethylenically unsaturated monomers in an amount of 10 to 90 wt % and c) one or more surfactants in an amount of 1 to 15 wt %, II) forming a mini-emulsion in water of the mixture obtained in step I), III) adding a free radical initiator before, during and/or after step I), II) and/or IV) in an amount of 0.05 to 6 wt % (based on the weight of the unsaturated monomers), IV) addition polymerizing the unsaturated monomers in the mini-emulsion forming a dispersion comprising 30 to 70% by weight of solids.

Mini-emulsions can be stabilized against Oswald ripening by the inclusion of a water insoluble compound often referred to as "hydrophobe". In the process according to the invention the modified AOC polymer is a relatively hydrophobic polymer having an acid number between 5 to 30, preferably between 5 and 25, more preferably between 5 and 20 Mg KOH/g. Preferably, in addition to the hydrophobic modified AOC polymer, the ethylenically unsaturated monomers comprise hydrophobic monomers, preferably lauryl of stearyl acrylate or methacrylate preferably in an amount between 2 to 10, more preferably between 3 and 5 mol % (relative to the total unsaturated monomer content). In addition, chain transfer agents such as dodecyl mercaptane or alpha-methyl styrene dimer can be included in the mixture to further prevent Oswald ripening. The hydrophobic nature of the modified AOC polymer in combination with hydrophobic unsaturated monomers obviates the necessity to use an additional (non-reactive) hydrophobe emulsion stabilizer to prevent Oswald ripening. Further, the hydrophobic nature of both the modified AOC polymer and the vinyl polymer result in hydrophobic coatings that have good water resistance and chemical resistance.

The standard range of droplet size is often defined as 50-500 nm. However, in this invention droplet smaller than 300 nm, more preferably smaller than 250 nm and even more preferably smaller than 200 nm are achievable and preferred.

Mini-emulsions can be prepared by using high pressure homogenizers, rotor-stator systems, static mixers and ultrasonifiers. Preferably, the mini emulsion has been prepared by high-pressure homogenisation in a high pressure homogenizer. In a first type of high pressure homogenizer the aqueous macro-emulsion is compressed to high pressure by means of a piston pump, for example, and is then released through a narrow slot. The effect here is based on interplay of high shear gradients and pressure gradients and, possibly, cavitation in the slot. A description of this method can be found in Manea et al. AICHE J. 2008, 54, 289-297. An example of such a homogenizer is the Manton-Gaulin high pressure homogenizer as described in GB190322875. This equipment is commercially available from Invensys as the APV-1000 and APV-2000 or from Niro-Soavi as the NS1001L PANDA.

In a second type of homogenizer the compressed aqueous macro-emulsion is released into a mixing chamber through two nozzles directed against one another. In this case the fine distribution effect is dependent in particular on the hydrodynamic conditions prevailing within the mixing chamber. One example of this type of homogenizer is the Microfluidizer type M 120 E from Microfluidics Corp. In this high-pressure homogenizer the aqueous macro-emulsion is compressed to pressures of up to 1200 bar by a pneumatically operated piston pump and is released via what is called an "interaction chamber". Within the "interaction chamber" the emulsion jet is divided, in a micro-channel system, into two jets which are collided at an angle of 180°.

High shear rotor-stator systems such as the Ultraturax homogenizer (IKA) can also be used, but is generally less effective in reducing the droplet size of the mini-emulsion (López et al. Ind. Eng. Chem. Res. 2008, 47, 6289-6297).

Another route, although not really preferred from a large-scale production perspective, is to prepare mini-emulsions by the use of ultrasound. The fine distribution here is based on cavitation mechanisms.

C Surfactants

The surfactant can be added to the mixture of the modified AOC polymer and vinyl monomers or more preferably to the water in which said mixture is dispersed. Surfactants of the reactive type can be used that become part of the polymer during the addition polymerisation. The total amount of surfactant is from 1 to 15% of the total weight of the mixture of the component (I) to (III). The amount of surfactant and the mini-emulsification conditions are such that a mini-emulsion of the required droplet size is formed substantially devoid of micelles.

Suitable low molecular weight surfactants are ionic or non-ionic surfactants. Examples of anionic emulsifiers are: potassium laurate, potassium stearate, potassium oleate, sodium decyl sulphate, sodium dodecyl sulphate, sodium alkyldiphenyl oxide disulfonate, and sodium rosinate. Examples of non-ionic emulsifiers are: linear and branched alkyl and alkylaryl polyethylene glycol ethers and thioethers and linear and branched alkyl and alkylaryl polypropylene glycol ethers and thioethers, alkylphenoxypoly(ethylenoxy) ethanols such as the adduct of 1 mole of nonylphenol to 5-50 moles of ethylene oxide, or the alkali salt or ammonium salt of the sulphate or the phosphate of said adduct.

Also low molecular weight surfactants containing an olefinicaly unsaturated group that can participate in a free radical polymerization can be used. Suitable polymerizable surfactants include hemi-esters of maleic anhydride of the formula M+.—OOC—CH=CHCOOR wherein R is C(6-22) alkyl and M+ is Na+, K+, Li+, NH$_4$+, or a protonated or quaternary amine. Polyoxyethylene alkylphenyl ethers with an ethylenically unsaturated bond sold under the tradename Noigen® RN (ex Montello, Inc.) such as NOIGEN RN-10™, NOIGEN RN-20, NOIGEN RN-30, NOIGEN RN-40™, and NOIGEN RN-5065™ or the sulphate thereof sold under the tradenarne Hitenol® BC (ex Montello, Inc.) such as HITENOL BC-10™, HITENOL BC-1025™, HITENOL BC-20™, HITENOL BC-2020™, HITENOL BC-30™. MAXEMUL™ 6106 (available from Croda Industrial Specialties), which has both phosphonate ester and ethoxy hydrophilicity, a nominal $C_{18}$ alkyl chain with an acrylate reactive group. Other representative reactive surfactants with phosphate ester functionalities suitable for such reactions include, but are not limited to, MAXEMUL™ 6112, MAXEMUL™ 5011, MAXEMUL™ 5010 (all available from Croda Industrial Specialties). Alternative reactive surfactants suitable for use with various embodiments of the present invention include sodium allyloxy hydroxypropyl sulphonate (available from Rhodia as SIPOMER COPS-1™), ADEKA REASOAP SR/ER series such as ADEKA REASOAP ER-10, ER-20, ER-30 and ER-40, Akeda Reasope SR-10, SR-20, SR-30 (all available from Adeka Co., Ltd.) and allylsulphosuccinate derivatives (such as TREM LF-40™ (available from Cognis)).

Polymeric surfactants or surface active oligomers can also be used provided they form micelles when added to the hybrid dispersion. The polymeric or oligomeric surfactants can provide sterical stabilization of the hybrid particles preventing coalescence of the particles. These oligomers typically characterized by relatively high acid values (e.g. 200 mg KOH/g). Most frequently, in particular in mini-emulsion polymerization, low molecular weight surfactants have to be used in combination with polymeric or oligomeric surfactants for control of particle size/number. Such low molecular weight surfactants more quickly stabilize the particles formed in the high shear rates during mini emulsion formation. Therefore, in a preferred embodiment of the process according to the invention the surfactants are polymeric or oligomeric surfactants preferably in combination with a low molecular weight surfactant.

Useful polymeric surfactants are commercially available under the trade name "JONCRYL" from BASF. Examples are JONCRYL 67, JONCRYL 586, JONCRYL 611, JONCRYL 678, JONCRYL 680, JONCRYL 682, JONCRYL 683, JONCRYL 690, and JONCRYL 693 which are styrene acrylic resins having 98% nonvolatile and 2% by weight volatile organic compounds, and are available in the form of clear flakes. Other commercially available polymers include CRAYMUL 8450, CRAYMUL 8460 from Cook Composites and Polymers. Polymeric surfactants comprising ethylenic unsaturated groups polymerizable in addition polymerization can also be used. Examples for the preparation of such polymers can be found for example in patent application WO 03/040192.

III/IV. Free Radical Initiator Addition and Mini-Emulsion Polymerization

Once a stable mini-emulsion is obtained it can be polymerized by the free-radical initiation system. The polymerization of the mini-emulsion formed in step (II) is performed by generating free radicals from suitable initiators. The radical initiator can be added to the mixture of step (I) or can be added before, during and/or after the mini-emulsion polymerisation step (II). Further, an additional amount of radical initiator can be added also after the addition polymerisation step IV) to reduce the amount of free monomers.

The initiator can be started to provide free radicals for the addition polymerization by raising the temperature, by chemical reaction with a starter, for example by a redox reaction, or by radiation, for example UV-radiation. Suitable initiators include inorganic peroxides such as potassium, sodium or ammonium persulphate, hydrogen peroxide, or percarbonates; organic peroxides, such as acyl-peroxides including benzoyl peroxide and alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as (iso-)ascorbic, acid alkali metal sulfite, pyrosulphite or bisulfite, sodium formaldehyde sulphoxylate, ammonium sulfite, sodium metabisulfite, ammonium bisulfite, sulfinic acid, 2-hydroxy-2-sulfinatoacetic acid, 2-hydroxy-2-sulfonatoacetic acid, 2-hydroxy-2-sulfonatoacetic acid, sulfamic acid, or sulfonic acid, and salts and derivatives of the foregoing. 2-Hydroxy-2-sulfinatoacetic acid and 2-hydroxy-2-sulfonatoacetic acid in sodium salt forms (a pure form), in combination with sodium bisulfite are available commercially from Bruggemann Chemical (Heilbron, Germany), as BRUGGOLITE® FF6 and BRUGGOLITE® FF7 reducing agents. Azo- compounds such as 2,2'-azobisisobutyro nitrile, 2,2'-azobis-2-methyl butyronitrile, 2,2'-azobis(2,4-dimethyl pentane nitrite), 2,2'-azobis (2-methyl propane nitrite), 2,2'-azobis(2-methyl butane nitrile), 1,1'-azo(cyclohexane carbonitrile) and 4,4'-azobis (4-cyanopentanoic) acid may also be used. Metal compounds such as Fe.EDTA (EDTA is ethylene diamine tetracetic acid) may also be usefully employed as part of the redox initiator system. The amount of initiator or initiator system to use is conventional, for example within the range of 0.05 to 6 wt % based on the weight of the olefinically unsaturated monomer(s) used.

In a preferred embodiment the radical initiation is done in at least 2 of 3 separate initiator addition steps; in a first step initial initiator is added to the mixture of step I, in a second step feed initiator is added during the addition polymerization step in several small portions or as a continuous feed and a third addition (chaser) is done after completion of the addition polymerisation step.

The invention further relates to an aqueous hybrid polymer dispersion obtainable according to the process of the invention. The size of the dispersed hybrid particles resulting from the process is between 50 and 300 nm, preferably between 50 and 150 nm.

The aqueous hybrid polymer dispersion preferably comprises 30 to 70% by weight of solids of hybrid polymer comprising: a) 10 to 90 wt % of one or more modified AOC polymers having been modified by pending unsaturated groups of the formula —C($R_1$)=$CH_2$ wherein $R_1$ can be hydrogen, alkyl or aryl at least partially grafted onto b) 10 to 90 wt % of an addition polymer. The aqueous hybrid polymer dispersion preferably is essentially free of volatile organic solvent.

The invention also relates to the use of the aqueous hybrid polymer dispersion according to the invention for the manufacture of coating compositions, ink compositions or adhesives, in particular to a coating composition comprising the hybrid polymer dispersion according to the invention as a binder.

The aqueous hybrid polymer dispersion or the coating composition prepared from the dispersion, wherein the composition further comprises from 0.1 to 60 wt % relative to the hybrid polymer weight of at least one additive selected from the group consisting of emulsifiers, defoamers, tackifiers, anti-sag agents, anti-settling agents, pigments, humectants, fillers, curing agents, thickeners, wetting agents, biocides, adhesion promoters, colorants, waxes, UV stabilizers and antioxidants. The invention also relates to a substrate coated with the aqueous hybrid polymer dispersion or the coating composition, which coated substrate has better water and chemical resistance and better optical surface properties like gloss and smoothness.

EXAMPLES

Example 1

Functionalized Alkyd Resin 1

100 g of Setal 293 XX-99, a solvent-free alkyd resin with an oil length of 84% and an acid value of 10 mg KOH/g, available from Nuplex Resins BV, 2.03 g of alycidyl methacrylate (GMA) and 0.034 g of a $1.5 \cdot 10^{-4}$ mol aqueous hydroquinone solution were all charged to a reactor fitted with a reflux condenser and a stirrer. The mixture was heated to 150° C., under continuous stirring. After 2 h, the mixture was cooled to 130° C. and 0.4 g of GMA was added. The mixture was heated to 160° C. for 1.5 h under stirring. Then, the reactor was allowed to cool to room temperature. The final acid number was 4 mg KOH/g.

Examples 2-6

Dispersions According to the Invention

Alkyd-acrylic dispersions were prepared using the raw materials given in table 1, using the following procedure. A mini-emulsion was prepared by dissolving the functionalized resin in vinyl monomers (=organic phase) and adding this under stirring to the water phase containing surfactant and buffering electrolyte. The coarse dispersion was then sonicated using a Branson 450 sonifier (15 min, power 9 and 80% duty cycle) to obtain a mini-emulsion. Finally, the mini-emulsion was further treated (6 cycles) with a high-pressure homogenizer (Niro-Soavi, NS10011L PANDA) with a pressure of 410 and 41 bar in the first and second stage valve, respectively.

The mini-emulsion was polymerized by charging it in a 1 liter glass reactor equipped with reflux condenser, stirrer, sampling device, and nitrogen inlet and kept under stirring and nitrogen atmosphere (12-15 ml/min). The mini-emulsion is heated to the desired reaction temperature. An initial aqueous initiator solution was injected as a shot when the reaction mixture reached the reaction temperature (90° C. for examples 2 and 3 and 70° C. for examples 4, 5 and 6) and then an aqueous solutions of a redox initiator (as two separate streams) were fed in 4 hours. After the end of the feeding, the temperature was lowered to 70° C. and an aqueous solution of an initiator and a reducing agent were separately fed into the reactor for 30 min. After the feeding of the chaser was completed, the reactor temperature was held at 70° C. for 30 min.

TABLE 1

|  |  | Example | 2 | 3 | 4 | 5 | 6 |
|---|---|---|---|---|---|---|---|
| Mini-emulsion | Organic phase | Resin from example 1 | 181.29 | 181.29 | 181.29 | 181.29 | 181.29 |
|  |  | Stearyl acrylate | 7.25 | 7.25 | 7.25 | 7.25 | 7.25 |
|  |  | Butyl acrylate | 89.72 | 90.64 | 89.72 | 90.64 | 45.32 |
|  |  | Butyl methacrylate | — | — | — | — | 135.96 |
|  |  | Methyl methacrylate | 89.72 | 90.64 | 89.72 | 90.64 | — |
|  |  | Acrylic acid | 1.81 | — | 1.81 | — | — |
|  | Water phase | Demineralized water | 39.75 | 39.75 | 39.75 | 39.75 | 39.75 |
|  |  | Reasoap SR-1025* | 9.98 | 9.98 | — | 9.98 | 9.98 |
|  |  | Dowfax 2A1** | — | — | 9.98 | — | — |
|  |  | Sodium bicarbonate | 1.14 | 1.14 | 1.14 | 1.14 | 1.14 |
| Polymerization | Initial initiator | Demineralized water | 9.42 | 9.42 | 9.42 | 9.42 | 9.42 |
|  |  | Ammonium persulphate | 0.45 | 0.45 | 0.45 | 0.45 | 0.45 |
|  | Fed redox intitiator | Demineralized water | 43.59 | 43.59 | 43.59 | 43.59 | 43.59 |
|  |  | Ammonium persulphate | 2.45 | 2.45 | 2.45 | 2.45 | 2.45 |
|  |  | Demineralized water | 43.59 | 43.59 | 43.59 | 43.59 | 43.59 |
|  |  | Sodium metabisulphite | 2.04 | 2.04 | 2.04 | 2.04 | 2.04 |
|  | Chaser | Demineralized water | 3.77 | 4 | 4.5 | 1.45 | 1.14 |
|  |  | Tertiary butyl hydroperoxide | 0.22 | 0.1 | 1.26 | 0.41 | 0.32 |
|  |  | Demineralized water | 10 | 10.2 | 5 | 10.13 | 7.92 |
|  |  | Ascorbic acid | 0.21 | 0.1 | 1.23 | — | — |
|  |  | Bruggolite FF7*** | — | — | — | 0.63 | 0.49 |

*reactive surfactant from Adeka Coorporation
**anionic surfactant from Dow Chemicals
***reducing agent from Bruggemann Chemical Examples 2 to 6 resulted in alkyd-acrylic hybrid dispersions with a solids content of 50%. The droplet size of the mini-emulsion $d_d$ and the particle size of the hybrid dispersion, $d_p$, are given in the table below (table 2): indicating clearly that droplet nucleation is the prevailing mechanism, hence hybrid particles are predominantly formed. Droplet and particle sizes were determined by dynamic light scattering, using a Malvern Nanosizer, which provides a z-average diameter.

TABLE 2

|  | $d_d$ (nm) | $d_p$ (nm) | ADG (%) |
|---|---|---|---|
| example 2 | 187 | 187 | 98 |
| example 3 | 171 | 166 | 80 |
| example 4 | 138 | 134 | 78 |
| example 5 | 188 | 177 | 99 |
| example 6 | 202 | 183 | 94 |

The fraction of acrylic polymer that contained grafted alkyd (acrylic degree of grafting (ADG)) was determined by Soxhlet extraction with a selective solvent that dissolves both the free alkyd resin and the polyacrylate-graft-alkyd. For these hybrid polymers diethyl ether was found to be a suitable solvent. Filters containing the latex sample were dried in a vacuum oven at room temperature and weighed before and after the extraction. Assuming that the neat ungrafted acrylic polymer was not dissolved, ADG was calculated as follows: ADG=(Acrylic grafted to resin)/(Total acrylic). A full description of the methodology used can be found in Minari et al, J. Appl. Polym. Sci. 114 (2009) 3143-3151). Characterization of the hybrid dispersions according to the methodology described above resulted in the values listed in table 2.

Example 7

Functionalized Alkyd Resin 2

An alkyd resin was synthesized by weighing in the following raw materials in a 5 liter three-neck, round-bottom flask equipped with a mechanical stirrer, Vigreux-column, Dean and Stark trap and inlet for nitrogen gas: sunflower fatty acid (Nouracid HE30): 3055 g, mono pentaerythritol: 585.2 g, maleic anhydride: 8.760 g and 30% aqueous phosphoric acid: 5.486 g. The reactor was heated to 250° C. and the mixture was reacted until an acid value of 11.7 mg KOH/gram was reached. The reaction mixture was cooled to 240° C. and 318.5 g of trimelitic anhydride was added in three portions. The mixture was further reacted until an acid value of 22.1 mg KOH/gram was reached. A total of 231 g of reaction water was collected. The solids content of the alkyd resin according to ISO 3251 was 99.6%. Final acid value was found to be 20.7 mg KOH/gram. Gel permeation chromatography (eluent THF, relative to polystyrene standards) showed a number average molecular weight of 2488 and a polydispersity index of 2.54. 100 g of this alkyd resin, 2.25 g of GMA and 0.04 g of 1% wt hydroquinone aqueous solution were all charged to a flask fitted with a reflux condenser and a stirrer. The content of the flask was heated to 150° C., under continuous stirring. After 2 h, the mixture was cooled to 130° C. and 0.44 g of GMA were added. Then, the mixture was heated to 160° C., maintaining the stirring for 1.5 h, being the final acid number of 14 mg KOH/g.

Examples 8-12

Dispersions According to the Invention

Alkyd-acrylic dispersions were prepared using the raw materials given in table 3, using the procedure described for examples 2-6. The polymerization temperature for examples 8 and 10 was 90° C., for examples 9, 11 and 12, the polymerization temperature was 70° C.

TABLE 3

| | | Example | 8 | 9 | 10 | 11 | 12 |
|---|---|---|---|---|---|---|---|
| Mini-emulsion | Organic phase | Resin from example 7 | 181.29 | 181.29 | 181.29 | 181.29 | 181.29 |
| | | Stearyl acrylate | 7.25 | 7.25 | 7.25 | 7.25 | 7.25 |
| | | Butyl acrylate | 89.72 | 90.64 | 89.72 | — | — |
| | | Butyl methacrylate | — | — | — | 90.64 | 90.64 |
| | | Methyl methacrylate | 89.72 | 90.64 | 89.72 | 90.64 | 90.64 |
| | | Acrylic acid | 1.81 | — | 1.81 | — | — |
| | Water phase | Demineralized water | 39.75 | 39.75 | 39.75 | 39.75 | 39.75 |
| | | Reasoap SR-1025* | 9.98 | 9.98 | — | 9.98 | 9.98 |
| | | Dowfax 2A1** | — | — | 9.98 | — | — |
| | | Sodium bicarbonate | 1.14 | 1.14 | 1.14 | 1.14 | 1.14 |
| Polymerization | Initial initiator | Demineralized water | 9.42 | 5.99 | 9.42 | 9.42 | 5.99 |
| | | Tertiary butyl hydroperoxide | — | 0.45 | — | — | 0.45 |
| | | Ammonium persulphate | 0.45 | — | 0.45 | 0.45 | — |
| | Fed redox intitiator | Demineralized water | 43.59 | 49.17 | 43.59 | 43.59 | 49.17 |
| | | Ammonium persulphate | 2.45 | 2.45 | 2.45 | 2.45 | — |
| | | Tertiary butyl hydroperoxide | — | — | — | — | 2.45 |
| | | Demineralized water | 43.59 | 48.07 | 43.59 | 43.59 | 48.07 |
| | | Ascorbic acid | — | 2.39 | — | — | 2.39 |
| | | Sodium metabisulphite | 2.04 | — | 2.04 | 2.04 | — |
| | Chaser | Demineralized water | 7.52 | 4 | 7.52 | 1.45 | 1.45 |
| | | Tertiary butyl hydroperoxide | 2.1 | 0.1 | 2.1 | 0.41 | 0.41 |
| | | Demineralized water | 8.43 | 10.2 | 8.43 | 10.13 | 10.13 |
| | | Ascorbic acid | 2.06 | 0.1 | 2.06 | — | — |
| | | Bruggolite FF7*** | — | — | — | 0.63 | 0.63 |

*reactive surfactant from Adeka Coorporation
**anionic surfactant from Dow Chemicals
***reducing agent from Bruggemann Chemical Examples 8 to 12 resulted in alkyd-acrylic hybrid dispersions with a solids content of 50%. The droplet size of the mini-emulsion $d_d$ and the particle size of the hybrid dispersion, $d_p$, are given in table 4. From the values above it is clear again that droplet nucleation is the predominant process, resulting in a high proportion of hybrid polymer particles. Characterization of the hybrid dispersions according to the methodology described above resulted in the values listed in Table 4. For all hybrid polymer samples an ADG of over 40% was found.

TABLE 4

| | $d_d$ (nm) | $d_p$ (nm) | ADG (%) |
|---|---|---|---|
| example 8 | 170 | 178 | 41 |
| example 9 | 182 | 185 | 95 |
| example 10 | 144 | 141 | 70 |
| example 11 | 179 | 177 | 99 |
| example 12 | 196 | 184 | 95 |

Examples 13-15 (comparative)

Mini-emulsions containing 50% wt solids contents with a composition given in table 5 were prepared following the procedure described above. When the mini-emulsion reached the reaction temperature, the batch was initiated. When the azo-initiator 2,2 azobis (2-methylbutyronitrile) (V59, Waco Chemicals) was used, it was dissolved in the organic phase prior to making the mini-emulsion. When potassium persulphate was used, the aqueous solution was added into the reactor as a shot. In the case of the tertiary butyl hydroperoxide (TBHP)/ascorbic acid (AsAc) redox initiator the oxidant was injected as a shot when the reaction mixture reached the desired temperature and then the reductant was fed. After the end of the feeding, a 30 minutes batch period was maintained.

TABLE 5

| | | | Example | | |
|---|---|---|---|---|---|
| | | | 13 | 14 | 15 |
| Mini-emulsion | Organic phase | Resin Setal 293 XX-99 | 185.15 | 185.15 | 172.58 |
| | | Stearyl acrylate | 7.39 | 7.39 | 6.90 |
| | | Butyl acrylate | 91.75 | 91.75 | 85.38 |
| | | Methyl methacrylate | 91.80 | 91.80 | 85.38 |
| | | Acrylic acid | 1.90 | 1.90 | 1.69 |
| | Water phase | Demineralized water | 40.00 | 42.48 | 41.60 |
| | | Reasoap SR-1025* | 0.00 | — | — |
| | | Dowfax 2A1** | 10.21 | 10.21 | 9.49 |
| | | Sodium bicarbonate | 1.21 | 1.21 | 1.09 |
| | | Demineralized water | 61.00 | 62.53 | 5.31 |
| Polymerization | Initial initiator | 2,2 azobis (2-methylbutyronitrile) | 2.90 | — | — |
| | | Potassium persulphate | — | 2.97 | — |
| | | Tertiary butyl hydroperoxide | — | — | 0.39 |
| | Fed redox intitiator | Demineralized water | — | — | 46.75 |
| | | Tertiary butyl hydroperoxide | — | — | 2.33 |
| | | Demineralized water | 10.00 | 5.70 | 2.51 |

TABLE 5-continued

|  | Example | | |
| --- | --- | --- | --- |
|  | 13 | 14 | 15 |
| Tertiary butyl hydroperoxide | 9.00 | 8.60 | 0.70 |
| Demineralized water | — | — | 45.75 |
| Ascorbic acid | — | — | 2.27 |
| Demineralized water | 28.10 | 28.10 | 2.81 |
| Ascorbic acid | 8.70 | 8.43 | 0.69 |

Examples 13 to 15 resulted in alkyd-acrylic hybrid dispersions with a solids content of 50%. The droplet size of the mini-emulsion dd and the particle size of the hybrid dispersion, dp, are given in the table below:

TABLE 5

|  | $d_d$ (nm) | $d_p$ (nm) |
| --- | --- | --- |
| example 13 | 100 | 105 |
| example 14 | 133 | 130 |
| example 15 | 147 | 133 |

Again, the values found indicate that the majority of the particles formed have a hybrid structure, However, when samples of examples 13 to 15 were drawn down onto a glass plate using a doctor blade (wet film thickness 100 nm) and allowed to dry, turbid films were obtained that clearly showed macroscopic phase separation. When formulated with a drier-salt solution (Nuodex WEB Cobalt 6, available from Rockwood Pigments, 0.25 wt % on hybrid dispersion), soft and tacky films resulted showing a strong haze and phase separation.

Example 16

A mini-emuision was prepared as described above by combining the raw materials given in table 6.

TABLE 6

| Methyl methacrylate | 99.50 |
| --- | --- |
| Butyl acrylate | 98.50 |
| Functionalized alkyd resin from example 7 | 197.60 |
| Stearyl acrylate | 7.90 |
| Allyl methacrylate | 0.50 |
| Reasoap SR1025 | 43.30 |
| $NaHCO_3$ | 1.25 |
| demineralized water | 304.00 |

The mini-emulsion thus obtained was polymerized following the procedure used for example 12. The resulting product was an alkyd-acrylic hybrid dispersion with a solids content of 50% and a particle size of 164 nm. A clear varnish was prepared by mixing the ingredients given in table 7.

TABLE 7

| Ingredient | Grams |
| --- | --- |
| Hybrid dispersion from example 16 | 45 |
| Texanol* | 2.25 |
| BYK 348** | 0.05 |
| Nuodex Web Co 6*** | 0.1 |

*2,2,4-trimethyl-1,3-pentaandiolmonoisobutyrate from Eastman Chemicals
**Polyether modified dimethylpolysiloxane from BYK Chemie
***Formulated cobalt drier from Rockwood Pigments.

The clear varnish was left to age for 24 hours and was then applied onto a glass plate using a doctor blade (wet film thickness 100 micron) The applied coating dries to form a highly transparent film with no evidence of phase separation. When left to dry for 24 hours at 23° C. and 50% relative humidity, the film was hard and tack-free.

The invention claimed is:

1. A process for the manufacture of an auto-oxidatively cross-linking hybrid polymer comprising the step of reacting in a mini-emulsion process, in the presence of a radical initiator and a surfactant, one or more ethylenically unsaturated monomers to form an addition polymer, wherein the addition polymer is a vinyl polymer in the presence of a modified auto-oxidatively crosslinkable (AOC) polymer which is an alkyd resin comprising unsaturated fatty acids, wherein the AOC alkyd polymer is a hydrophobic alkyd polymer having an acid number from 5 to 20 mg KOH/g and an oil length of the resin between 40 and 95% , and wherein the modified AOC alkyd polymer is prepared by reaction of hydroxyl reactive groups on the AOC alkyd polymer with a compound comprising a terminal unsaturated group and isocyanate reactive groups.

2. The process according to claim 1, wherein the average amount of the terminal unsaturated groups per molecule of the modified AOC polymer is more than 1.

3. The process according to claim 1, comprising the steps of:
   I. mixing:
      a) one or more modified AOC polymers,
      b) one or more ethylenically unsaturated monomers,
      c) one or more surfactants
   II. forming a mini-emulsion in water of the mixture obtained in step I),
   III. adding a free radical initiator before, during and/or after step I), II) and/or IV),
   IV. addition polymerizing the unsaturated monomers in the mini-emulsion to form a dispersion of hybrid particles of the auto-oxidatively crosslinkable polymer and the addition polymer.

4. The process according to claim 1, comprising the steps of:
   I. mixing:
      a) one or more modified AOC polymer in an amount of 10 to 90wt %, wherein the wt % is defined as the weight relative to the total weight of the mixture of the components in step (I) to (III),
      b) one or more ethylenically unsaturated monomers in an amount of 10 to 90 wt %,
      c) one or more surfactants in an amount of 1 to 15 wt %,
   II. forming a mini-emulsion in water of the mixture obtained in step I),
   III. adding a free radical initiator before, during and/or after step I), II) and/or IV), in an amount of 0.05 to 6 wt % (based on the weight of the unsaturated monomers), IV. addition polymerizing the unsaturated monomers in the mini-emulsion forming a dispersion comprising 30 to 70% by weight of solids.

5. The process according to claim 1, wherein in addition to the hydrophobic modified AOC polymer, the ethylenically unsaturated monomers comprise hydrophobic monomers.

6. The process according to claim 5, wherein the hydrophobic monomers are lauryl or stearyl acrylate or methacrylate.

7. The process according to claim 5, wherein the hydrophobic monomers are present in an amount of between 2 and 10 mol %, relative to the total unsaturated monomer content.

8. The process according to claim 1, wherein the amount of modified AOC polymer relative to the total of the modified AOC polymer and the vinyl polymer is between 25 and 75 wt %.

9. The process according to claim 1, wherein the number average molecular weight of the modified AOC polymer is between 1000 and 50,000 and the oil length of the resin is between 40 and 85%.

10. An aqueous hybrid polymer dispersion obtained according to the process of claim 1 comprising 30 to 70% by weight of solids of hybrid polymer comprising:

a. 10 to 90 wt % of the one or more modified AOC polymers, b. 10 to 90 wt % of an addition polymer.

11. The aqueous hybrid polymer dispersion according to claim 10, wherein the volatile organic compound (VOC) amount is less than 25 g/l.

12. The aqueous hybrid polymer dispersion according to claim 10, wherein the aqueous hybrid polymer dispersion is used in the manufacture of coating compositions, ink compositions or adhesives.

13. The hybrid polymer dispersion according to claim 10, wherein the hybrid polymer dispersion is a binder in a coating composition.

14. A substrate coated with the coating composition according to claim 13.

15. A substrate coated with the aqueous hybrid polymer dispersion of claim 10.

16. A substrate coated with the aqueous hybrid polymer dispersion of claim 11.

* * * * *